No. 706,649.  
A. F. GARDANIER.  
EGG OPENER.  
(Application filed Sept. 26, 1901.)  
Patented Aug. 12, 1902.

(No Model.)

WITNESSES:  
W. H. Cotton  
F. P. Blackman

INVENTOR.  
Ada F. Gardanier.  
BY  
ATTORNEY.

UNITED STATES PATENT OFFICE.

ADA F. GARDANIER, OF CHICAGO, ILLINOIS.

EGG-OPENER.

SPECIFICATION forming part of Letters Patent No. 706,649, dated August 12, 1902.

Application filed September 26, 1901. Serial No. 76,602. (No model.)

*To all whom it may concern:*

Be it known that I, ADA F. GARDANIER, a citizen of the United States, residing at Chicago, in the county of Cook and State of Illinois, have invented certain new and useful Improvements in Egg-Openers, of which the following is a specification.

My invention relates to devices for breaking or cutting the shell of an egg to permit of the removal of the contents thereof.

The nuisance, annoyance, and inconvenience attendant upon the act of opening a hot boiled egg in the usual manner are too well known to require special comment or even mention.

The object of my invention is the construction of a device which will obviate the necessity of holding the hot egg in the hand or in any way handling the same in opening and which will in a simple manner cut the shell to divide the egg longitudinally into two parts to permit the removal of one portion thereof that access may be had to the interior.

In a general way my invention consists in the combination of one or more revoluble cutters with means for firmly holding an egg in contact with said cutter or cutters; and my invention further consists in the various details of construction and in combinations of parts, all as hereinafter described, and particularly pointed out in the claims.

The invention will be more readily understood by reference to the accompanying drawings, forming a part of this specification, and in which—

Figure 2:
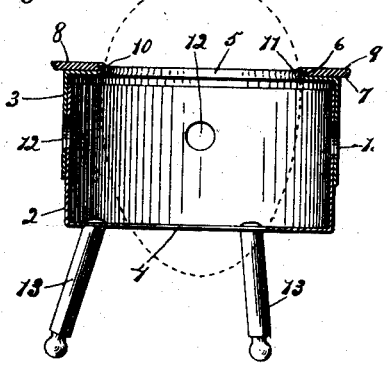
Figure 1:
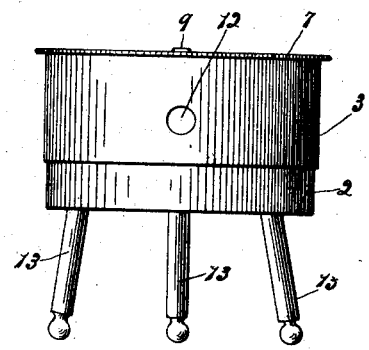
Figure 3:
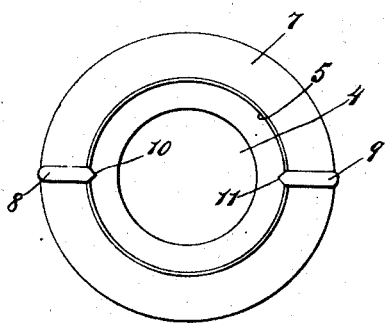
Figure 4:
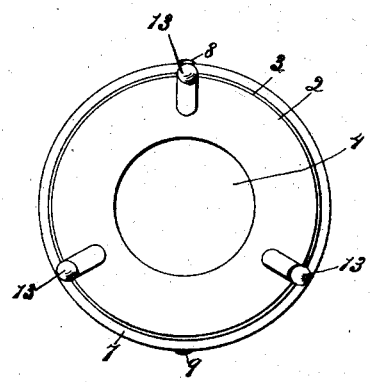

Figure 1 is a side elevation of a device embodying my invention. Fig. 2 is a vertical central section of the same, illustrating the manner in which the egg is placed therein. Fig. 3 is a top plan, and Fig. 4 is a bottom plan, of the same.

Referring now to the drawings in detail, the numerals 2 and 3 refer to end-telescoping cylindrical cups, preferably made of light sheet metal, the lower cup 2 being provided in the center of the bottom thereof with the circular aperture 4, said aperture being of a size to permit the extension therethrough for a slight distance of the smaller end of an egg. The inverted cup 3 is similarly provided with the central circular aperture 5, about the same in diameter as the greatest diameter along the major axis of an egg of average size. The circular bottom plate of the inverted cup 3 is provided with the grooved rim 6, substantially U-shaped and extending around the whole circumference of the aperture 5, adapted to hold in place an annular disk 7, rotatably slidable therein. The disk 7 preferably projects slightly beyond the periphery of said cup 3 and is provided with a milled edge to permit of its ready and easy rotation by hand. Suitably mounted upon this disk 7 are the knives or cutters 8 and 9, (two being shown located on opposite sides of said aperture 5, although one will suffice,) the sharp points 10 and 11 thereof projecting slightly into said aperture 5.

In utilizing my device I first remove the inverted cup 3 and insert the egg in the lower cup 2, as shown, with the smaller end projecting slightly through the lower aperture 4. The cup 3 is then telescoped over the lower cup 2 and firmly pressed down until the projecting cutters 8 and 9 break through the shell of the egg. The egg is thus held firmly, and the rotation of the disk 7 continuing the slight downward pressure will cleanly cut the shell, permitting the removal of the upper portion thereof to give access to the interior. I have shown a plurality of similar perforations 12 12 through the side walls of both of said cups, which may be of any convenient size, location, and number. These perforations are designed to permit the escape of the hot air in the interior of said cups and preventing excessive heating of the device. I have also shown my device mounted upon suitable legs or standards 13 13, which are for convenience in handling merely and form no part of my invention.

Many modifications of the minor details of my improved egg-opener will doubtless readily suggest themselves to those skilled in the art to which it appertains, and I therefore do not desire to limit my invention to the specific construction herein shown and described.

Having thus described my invention, I claim as new and desire to secure by Letters Patent—

1. In an egg-opener, the combination of two end-telescoping, cylindrical cups, central, circular apertures in the bottoms of both of said cups, and a revoluble knife, the cutting-point of which projects into the aperture of the inverted cup.

2. In an egg-opener, the combination of two end-telescoping, cylindrical cups, central, circular apertures in the bottoms of both of said cups, and an annular disk slidably rotatable on the bottom of the inverted cup and carrying at least one inwardly-pointing knife the cutting-point of which projects into the aperture of said inverted cup.

3. In an egg-opener, the combination of two end-telescoping, cylindrical cups, central, circular apertures in the bottoms of both of said cups, a grooved rim around the aperture in the bottom of the inverted cup, and an annular disk slidably rotatable within said groove and carrying at least one knife the cutting-point of which projects into the aperture of said inverted cup.

In testimony of the foregoing I have hereunto set my hand this 16th day of September, 1901, in the presence of two subscribing witnesses.

ADA F. GARDANIER.

Witnesses:
A. H. SYMONS,
GERALD TURNBULL.